(12) United States Patent
Campbell et al.

(10) Patent No.: US 7,516,072 B2
(45) Date of Patent: Apr. 7, 2009

(54) SYSTEM AND METHOD FOR SELECTING A USER SPEECH PROFILE FOR A DEVICE IN A VEHICLE

(75) Inventors: Douglas C. Campbell, Northville, MI (US); Michael Supanich, Holland, MI (US); Mark L. Zeinstra, Holland, MI (US)

(73) Assignee: Johnson Controls Technology Company, Holland MI ( * ) Notice: Subject to any disclaimer, the term of this patent is extended or adjusted under 35 U.S.C. 154(b) by 255 days.

(21) Appl. No.: 10/576,842

(22) PCT Filed: Oct. 21, 2004

(86) PCT No.: PCT/US2004/034871

§ 371 (c)(1),
(2), (4) Date: Apr. 20, 2006

(87) PCT Pub. No.: WO2005/042314

PCT Pub. Date: May 12, 2005

(65) Prior Publication Data

US 2007/0082706 A1    Apr. 12, 2007

Related U.S. Application Data

(60) Provisional application No. 60/513,117, filed on Oct. 21, 2003.

(51) Int. Cl.
*G10L 11/00* (2006.01)
(52) U.S. Cl. .............. 704/270; 704/270.1; 704/273; 381/86
(58) Field of Classification Search ............. None
See application file for complete search history.

(56) References Cited

U.S. PATENT DOCUMENTS 4,797,924 A * 1/1989 Schnars et al. .............. 704/275

(Continued)

FOREIGN PATENT DOCUMENTS

DE    100 23 780 A1    12/2001
EP    1 246 414 A2    10/2002

OTHER PUBLICATIONS

International Search Report for PCT/US2004/034871, date of mailing Feb. 24, 2005, 2 pages.

(Continued)

*Primary Examiner*—David R Hudspeth
*Assistant Examiner*—Brian L Albertalli
(74) *Attorney, Agent, or Firm*—Foley & Lardner LLP

(57) ABSTRACT

A system for selecting a user speech profile for a device in a vehicle includes a control module having a speech recognition system and a memory. The speech recognition system is configured to process audio signals and includes a speaker enrollment function configured to create a user speech profile for at least one user. The memory is configured to store a plurality of user speech profiles created by the speaker enrollment function. The system may include an external device configured to transmit a control signal to the vehicle including an identifier. Alternatively, the system may include a user input device configured to receive an input command from a user that includes an identifier. The control module uses the identifier to select a user speech profile from the plurality of user speech profiles and the speech recognition system uses the selected user speech profile to process audio signals from the user.

15 Claims, 5 Drawing Sheets

U.S. PATENT DOCUMENTS

| | | | | |
|---|---|---|---|---|
| 5,956,684 | A | * | 9/1999 | Ishii et al. .................... 704/275 |
| 6,493,669 | B1 | * | 12/2002 | Curry et al. .................. 704/257 |
| 6,496,107 | B1 | * | 12/2002 | Himmelstein ............ 340/426.1 |
| 6,498,970 | B2 | * | 12/2002 | Colmenarez et al. .......... 701/36 |
| 7,099,825 | B1 | * | 8/2006 | Cook ......................... 704/251 |

OTHER PUBLICATIONS

Fawcett J K: "Supporting Human Interaction With the Sentient Vehicle", Proceedings of the IEEE 5th International Conference on Intelligent Transport Systems, Sep. 3, 2002, pp. 307-312.

* cited by examiner

SYSTEM AND METHOD FOR SELECTING A USER SPEECH PROFILE FOR A DEVICE IN A VEHICLE

FIELD OF THE INVENTION

The present invention relates to in-vehicle systems and devices utilizing a speech recognition system such as a wireless communication system and, in particular, to a system and method for selecting a user speech profile for a speech recognition system included in a device or system in a vehicle.

BACKGROUND OF THE INVENTION

Various systems and devices may be provided in a vehicle interior that utilize a speech recognition system or software, such as a hands-free telephone system, a navigation system, an audio system, etc. Hands-free telephone systems have been developed for a vehicle that allow the hands-free use of a driver's or passenger's personal mobile phone. For example, a hands-free telephone system for a vehicle may include a microphone and speakers mounted in the interior of the vehicle and a processing or control circuit which processes spoken commands from a vehicle occupant and performs telephone operations, such as making a telephone call. Speech recognition is used to recognize a spoken command from a vehicle occupant to make a telephone call and to receive a telephone number via spoken words from the-vehicle occupant. Speech recognition may also be used in other vehicle systems and devices, for example, a navigation system, to recognize voice commands from a vehicle occupant.

Many speech recognition systems allow a user to train the speech recognition system to their voice and dialect and create a user speech profile. Multiple different users (e.g., a driver and passengers of a vehicle), however, may use a hands-free phone system or other voice recognition enabled systems in the vehicle. There is a need, therefore, for a system and method to identify the user of the hands-free phone system or other voice controlled system in the vehicle in order to select the appropriate user speech profile for the speech recognition system.

SUMMARY OF THE INVENTION

In accordance with one embodiment, a system for selecting a user speech profile for a device in a vehicle includes a control module including a speech recognition system configured to process audio signals and having a speaker enrollment function configured to create a user speech profile for at least one user and a memory coupled to the speech recognition system and configured to store a plurality of user speech profiles. The system further includes an external device configured to transmit a control signal to the vehicle including an identifier, wherein the control module uses the identifier to select a user speech profile from the plurality if user speech profiles and the speech recognition system uses the selected user speech profile to process audio signals from the user. In one embodiment, the external device is a wireless external device. The wireless external device may be, for example, an RKE key fob, a wireless phone, a personal digital assistant, a pager, a portable computer, a passive entry key, a smart card, an optical entry device or a magnetic entry device. In another embodiment, the external device is, for example, a vehicle key or a removable memory device. In another embodiment, a plurality of external devices are configured to include an identifier and the memory includes a prioritization list indicating a user preference for each external device.

In accordance with another embodiment, a system for selecting a user speech profile for a device in a vehicle includes a control module including a speech recognition system configured to process audio signals and having a speaker enrollment function configured to create a user speech profile for at least one user and a memory coupled to the speech recognition system and configured to store a plurality of user speech profiles. The system further includes a user input device configured to receive an input command from a user that includes an identifier, wherein the control module uses the identifier to select a user speech profile from the plurality of user speech profiles and the speech recognition system uses the selected user speech profile to process audio signals from the user. The user input device may be, for example, a microphone configured to receive a voice signal from the user, a memory switch, a keypad or a biometric identification device. In another embodiment, the system includes a plurality of user input devices configured to receive an input command from a user that includes an identifier, and the memory includes a user prioritization list indicating a user preference for each user input device.

In accordance with a further embodiment, a method for selecting a user speech profile for a device in a vehicle includes creating a user speech profile for at least one user using a speaker enrollment function of a speech recognition system, storing a plurality of user speech profiles, each user speech profile associated with a different user, and receiving a control signal including an identifier. The identifier is used to select a user speech profile from the plurality of user speech profiles and the selected user speech profile is used to process audio signals from the user.

In accordance with yet another embodiment, a method for selecting a user speech profile for a device in a vehicle includes creating a user speech profile for at least one user using a speaker enrollment function of a speech recognition system, storing a plurality of user speech profiles, each user speech profile associated with a different user and receiving an input command from a user that includes an identifier. The identifier is used to select a user speech profile from the plurality of user speech profiles and the selected user speech profile is used to process audio signals from the user.

BRIEF DESCRIPTION OF THE DRAWINGS

The invention will be more readily understood by reference to the following description taken with the accompanying drawings, in which.

DETAILED DESCRIPTION OF THE PREFERRED AND OTHER EXEMPLARY EMBODIMENTS

Figure 1A:
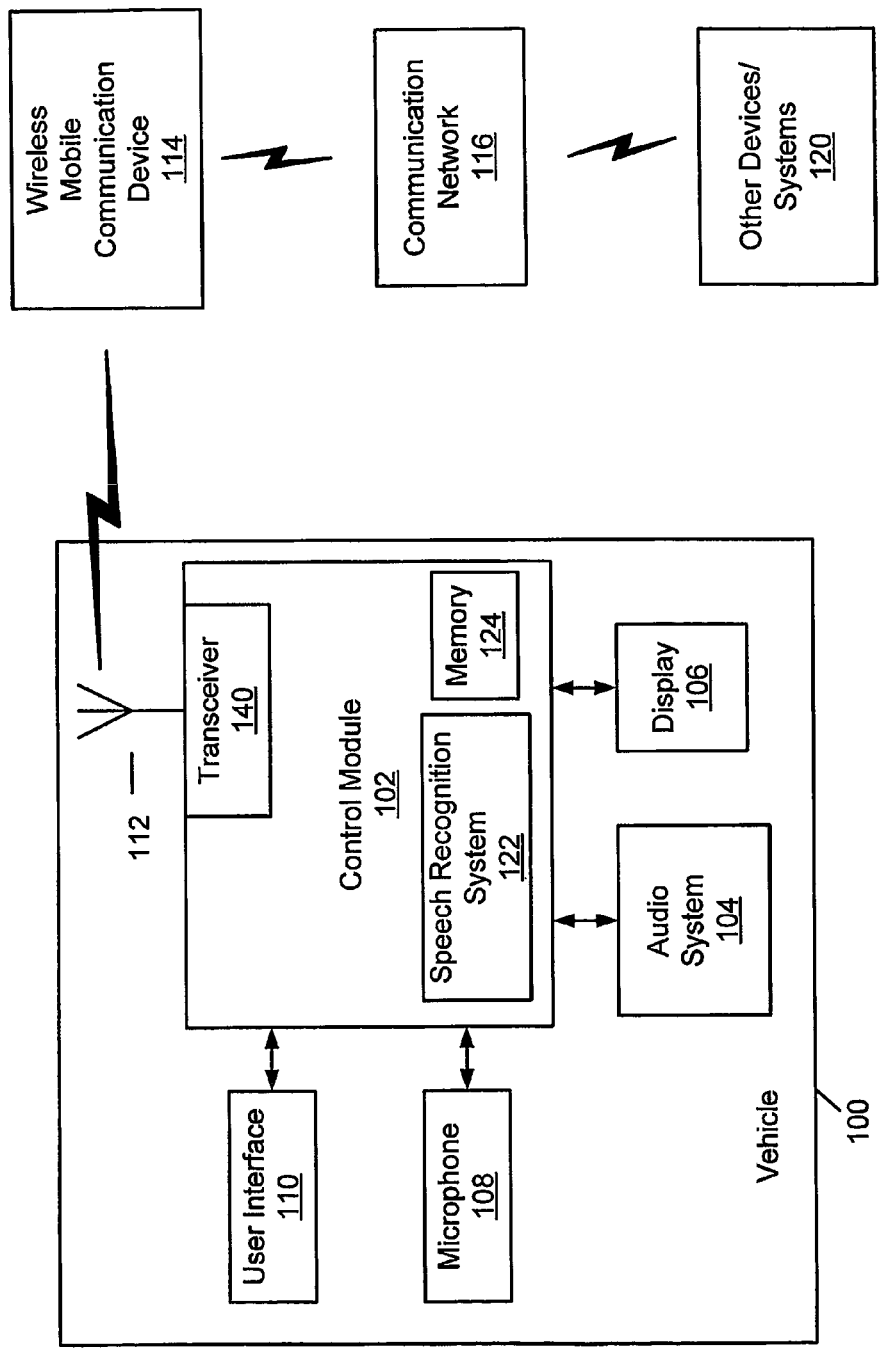
FIG. 1A is a schematic block diagram of a system for hands-free operation of a wireless communication device in a vehicle in accordance with an embodiment.

FIG. 1A is a schematic block diagram of a system for hands-free operation of a wireless communication device in a vehicle in accordance with an embodiment. The system enables a vehicle occupant, such as a driver, to use the occupant's personal portable wireless phone 114 to make a hands-free call to another device or system 120 via communication network 116 without requiring the driver to take his/her eyes off of the road and/or his/her hands off of the steering wheel while the vehicle is in motion. Other vehicle occupants (e.g., passengers) may also use the system to make hands-free calls. The following description will refer to a wireless communication system, e.g., a hands-free telephone system, however, the systems and methods described herein may also be used in conjunction with other devices or systems in the car that are controlled by or used to control other devices using verbal commands and therefore include or utilize a speech recognition system and, in particular, a speech recognition system having a speaker enrollment function. For example, systems such as a navigation system, an audio system, etc. may utilize a speech recognition system. While a wireless communication system and, in particular, a hands free wireless communication system will be referred to throughout the discussion of various preferred embodiments, it should be understood the embodiments of the systems and methods for selecting a user speech profile are not limited to use with a wireless communication system.

The system shown in FIG. 1A enables a wireless communication link to be established between an audio system 104 of vehicle 100 and a portable wireless communications device 114 of a vehicle occupant such as a wireless mobile phone (e.g., a cellular phone, a PCS-based phone or other mobile telephone system), a handheld computer, a personal digital assistant (PDA). The following description will refer to a wireless or cellular phone, however, it should be understood that systems and methods described herein may be used in conjunction with other wireless communication devices, such as a PDA (personal digital assistant), a portable computer, a pager, etc.

Figure 1B:
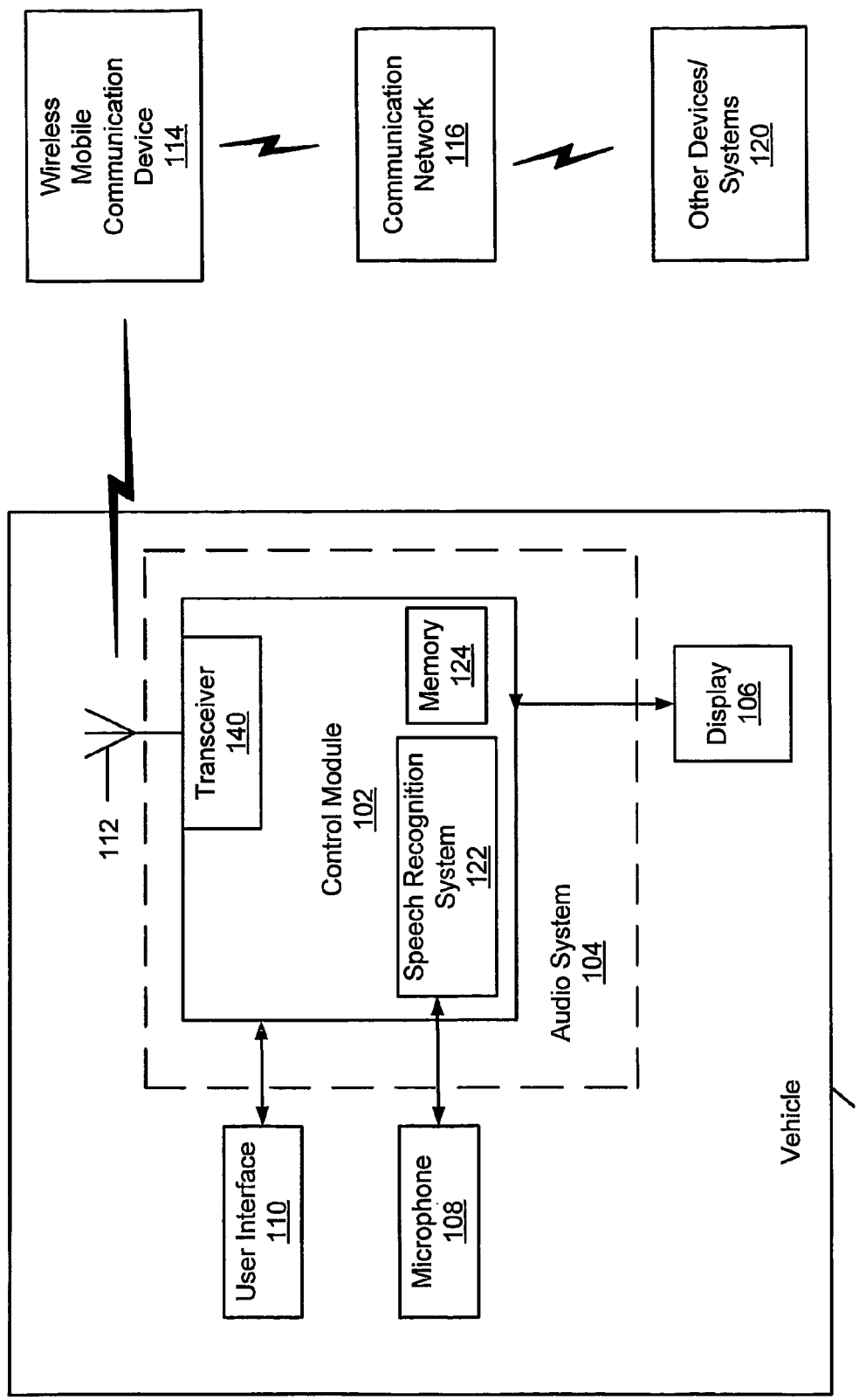
FIG. 1B is a schematic block diagram of a system for hands-free operation of a wireless communication device in a vehicle in accordance with an alternative embodiment.

Returning to FIG. 1A, the wireless communication system in vehicle 100 also includes a control module 102 coupled to the audio system 104 and an antenna 112. In an alternative embodiment, shown in FIG. 1B, control module 102 is incorporated into an audio system 104. Returning to FIG. 1A, antenna 112, in conjunction with an RF transceiver 140 in control module 102, enables two-way communication with the wireless phone 114. RF transceiver 140 is configured to transmit and receive signals from wireless communication device 114. RF transceiver 140 may be a communication circuit including analog and/or digital components configured to transmit and receive wireless data (including voice data) in any of a variety of data transmission formats, such as a Bluetooth communications protocol, an IEEE 802.11 communications protocol or other personal area network protocols or other wireless communications protocols or data formats. Wireless communication device 114 may include a plurality of transceiver circuits, for example, a Bluetooth transceiver circuit configured to communicate with transceiver 140 and a cellular transceiver circuit using a cellular communication format (e.g., CDMA, TDMA, etc.) configured to communicate with a wireless communication network 116.

Control module 102 is also coupled to a user interface 110 and a microphone 108. User interface 110 may be used to receive input commands from a vehicle occupant via, for example, pushbuttons, switches, a keypad, a touch screen display, etc. Alternatively, input commands may be a set of audio signals from a vehicle occupant. For example, a vehicle occupant may speak directly into the microphone 108 to provide commands to the control module 102. The spoken command may be any word that the occupant utters or provides to cause the wireless communication system or another system to perform a function. Microphone 108 may include one or more microphones configured to receive a spoken command from a vehicle occupant. A speech recognition system (or software) 122 in control module 102 may be used to process audio signals (e.g., voice commands) received by microphone 108 and to recognize words or phrases in the spoken command. Voice recognition technologies known in the art may be implemented in speech recognition system 122. For example, speech recognition system 122 may comprise any speech recognition software or engine such as embedded Via Voice®, manufactured by International Business Machines Corporation.

Control module 102 may also be coupled to a display 106 that may, for example, comprise a small cathode ray tube (CRT), a liquid crystal display (LCD) or various other forms of displays which are easily visible in daytime as well as nighttime driving conditions. Control module 102 may comprise one or more analog and/or digital electrical or electronic components, and may include a microprocessor, microcontroller, application-specific integrated circuit (ASIC), programmable logic and/or other analog and/or digital circuit elements configured to perform various input/output, control, analysis and other functions to be described herein. Control module 102 may also include memory 124, including volatile and non-volatile memory to, for example, store a computer program or other software to perform the functions described herein. Each element in vehicle 100 shown in FIG. 1A, may be mounted in the same or different interior vehicle elements such as a dashboard, instrument panel, an overhead console, a visor, a rearview mirror, or other appropriate location in the vehicle. Preferably, user interface 110, microphone 108 and display 106 are mounted in a location convenient to the vehicle occupants, in particular, the driver.

Audio system 104 may include, for example, a radio, an amplifier and at least one speaker (228, FIG. 2) configured to provide audio signals to a vehicle occupant(s). The speakers are configured to receive audio output data from control module 102 and/or other vehicle systems (e.g., an audible communication from another party to a telephone call, information prompts or other messages generated by control module 102). The speakers may be a part of the vehicle audio system 104 or may be a dedicated speaker serving only control module 102. In one embodiment, audio system 104 may include a speech recording/playback system as described in U.S. Pat. No. 5,810,420, herein incorporated by reference.

As mentioned above, control module 102 is linked via a wireless communication link with a wireless communication device 114 such as a wireless phone. A communication link may be established with different wireless phones as different occupants use the communication system. A communication link may be established, for example, in response to a command received from the user via user interface 110 or a verbal signal received by microphone 108. The wireless communication link operates in accordance with a wireless communications standard. The wireless communications standard is preferably the Bluetooth communications standard but may be, for example, the Shared Wireless Access Protocol-Cordless Access (SWAP-CA) specification, an IEEE 802.11 communications protocol or any other suitable personal area network or wireless communication standard that enables the transmission of voice and/or data information. Accordingly, wireless phone 114 is enabled to operate in accordance with or to communicate with the wireless communication standard of the wireless communication link.

The communication link between the control module 102 and the wireless phone 114 enables hands-free use of a vehicle occupant's personal wireless phone 114 including both outgoing and incoming calls. For example, a user may dial a number on the wireless phone 114 to place a call and the conversation thereafter can be conducted via the microphone 108 and audio system 104. Alternatively, a call could be placed via commands and numbers spoken into microphone 108 and transmitted via the wireless communications link to the wireless phone 114. Calls and information may also be received by control module 102 from wireless phone 114 via the wireless communication link. Audio information received may be provided to the user via audio system 104 and data received from the wireless phone 114 may be displayed on display 106. Wireless device 114 may be located anywhere within the proximity of vehicle 100, such as in an occupant's pocket or briefcase, in the trunk or within a range of communication with transceiver 140.

For an outgoing call, audio signals received via microphone 108 are processed by the control module 102 and sent to the wireless phone 114 in the proper data format, for example, in accordance with the Bluetooth communication standard. The wireless phone 114 converts the signals received from the control module 102 to the appropriate cellular or wireless technology of the wireless service provider associated with the vehicle occupant's wireless phone 114 (e.g., Analog, Digital, CDMA, TDMA, GSM, etc.). The converted signal is then sent by the wireless phone 114 to a communication network 116 (e.g., cellular tower(s)) for transmission to the desired end device or system 120. For example, a cellular tower may receive a signal from the wireless phone 114, convert the signal to a "land line" signal and send the signal through a switch to the phone being called. Typically, at various stages in the communication process the signal is processed to, for example, reduce noise, echo, etc. For example, the control module 102 may process the signal received from the microphone 108 to reduce the noise from the vehicle.

As mentioned, a user may provide verbal commands to control module 102 via microphone 108. Accordingly, control module 102 includes a speech recognition system 122 that is used to process voice commands. As discussed above, voice recognition technologies known in the art may be implemented in speech recognition system 122 such as any speech recognition software or engine, for example, embedded Via Voice®, manufactured by International Business Machines Corporation. Preferably, speech recognition system 122 includes a speaker enrollment function that enables a user to train the speech recognition system to their voice and dialect. The speaker enrollment function typically improves the ability of speech recognition system 122 to recognize and process the voice commands provided by the user. Multiple users may each utilize the speaker enrollment function to train speech recognition system 122. For example, a first user may initiate a training sequence and perform a series of steps in which the user speaks predetermined words, phrases and or sentences into microphone 108. The training sequence may be initiated by, for example, the user actuating an input device of user interface 110 or by providing a verbal command received by microphone 108. The speaker enrollment function processes the voice and dialect of the first user and creates a user speech profile for the first user. The user speech profile may be stored in memory 124 coupled to speech recognition system 122. User speech profiles may also be created for a second user, a third user, etc. Accordingly, the appropriate user and user speech profile should be selected so that speech recognition system 122 uses the appropriate voice patterns to process voice commands from the user.

Figure 2A:
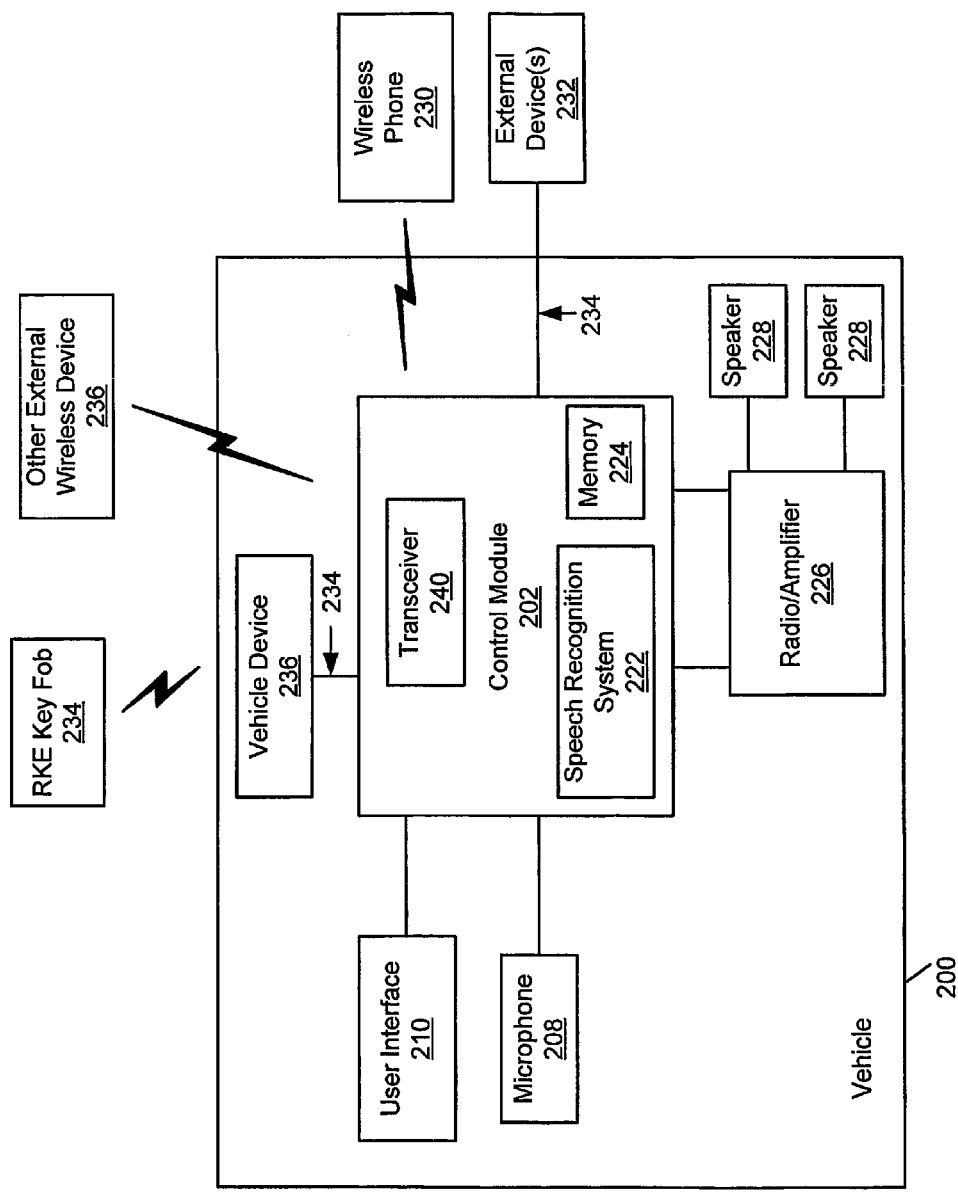
FIG. 2A is a schematic block diagram of a system for selecting a user speech profile for a hands-free wireless communication system in accordance with an embodiment.
Figure 2B:
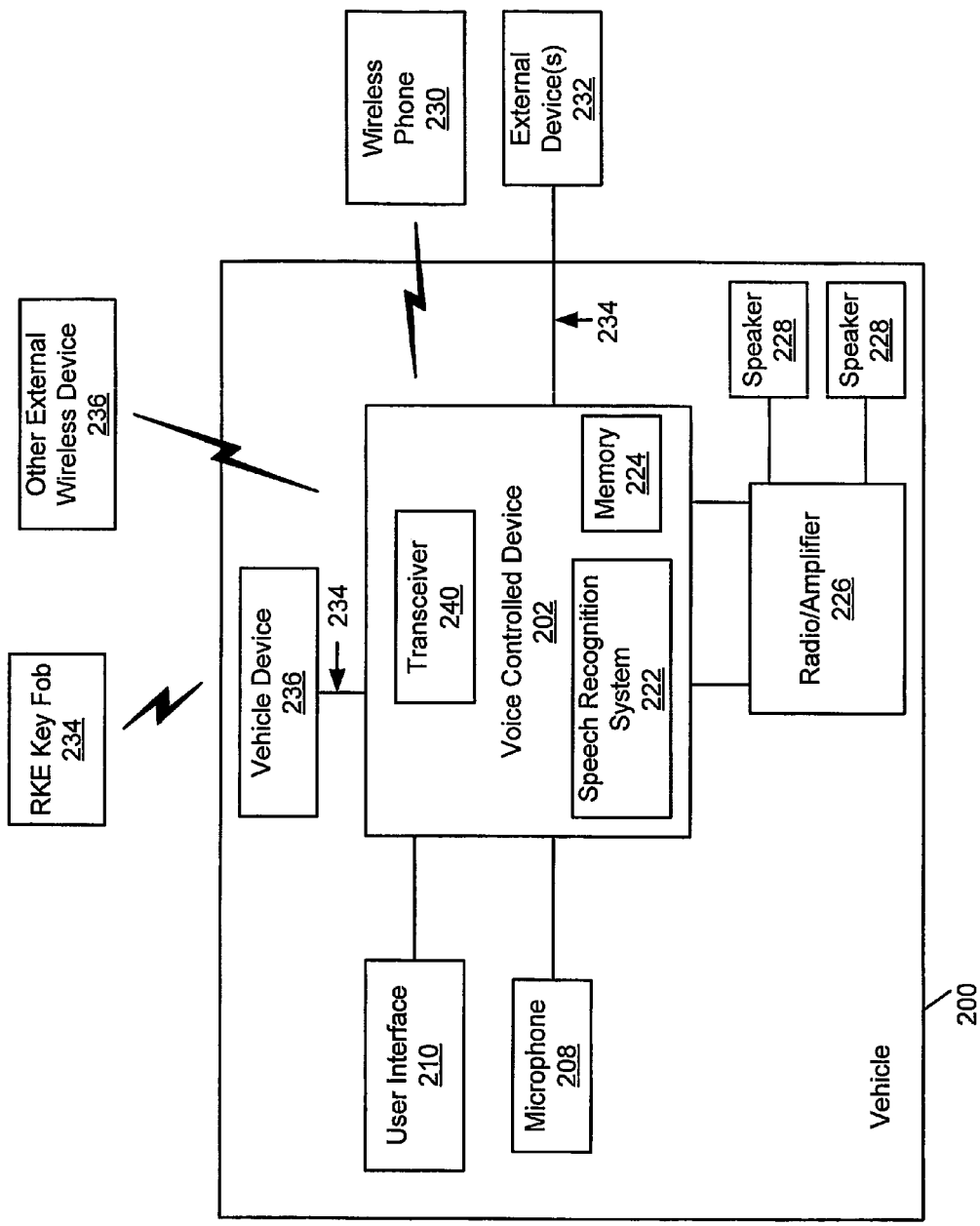
FIG. 2B is a schematic block diagram of a system for selecting a speech profile for a voice controlled device in a vehicle in accordance with an embodiment.

FIG. 2A is a schematic block diagram of a system for selecting a user profile for a hands-free wireless communication system in accordance with an embodiment. As mentioned above, the system for selecting a user speech profile may be used with other devices in the vehicle that may include or utilize a speech recognition system such as a navigation system as shown in FIG. 2B. In FIG. 2B, transceiver 202 may be integrated in voice controlled device 202 (e.g., a navigation system) or may be located elsewhere in the vehicle and coupled to the voice controlled device 202. Returning to FIG. 2A, control module 202 includes speech recognition system 222 and memory 224 and is coupled to microphone 208 and audio system 204. Audio system 204 may include, for example, a radio/amplifier 226 and speakers 228. As mentioned with respect to FIG. 1B, in one embodiment, the control module 202 is incorporated into audio system 204. Speech recognition system 222 includes a speaker enrollment function as described above with respect to FIG. 1A. User speech profiles generated by the speech enrollment function for a plurality of users may be stored in memory 224. In one embodiment, each user speech profile is assigned a memory location identifier that may be selected by the user using, for example, a user interface 210 such as a memory switch, a numeric keypad, etc. When a user enters an identifier or activates a memory switch, speech recognition system 222 retrieves the appropriate user speech profile. Alternatively, a voice print of the user may be used to identify the appropriate user speech profile, i.e., when a user speaks into microphone 108, speech recognition system 222 may be configured to identify the user by their voice.

In another embodiment, an external wireless device 236 may be used to provide an identifier to select a specific user speech profile stored in memory 224. For example, a remote keyless entry (RKE) key fob 234 is used to wirelessly transmit an RF control signal to a vehicle to control a function of a vehicle device 236 such as door locks, windows, etc. The control signal may be configured to include an identifier for a user speech profile. Control module 102 is coupled to and has access to a vehicle data bus 234 that may carry the information from the control signal provided by the RKE key fob 234. Upon receipt of the control signal (e.g. after the user actuates the key fob to send the control signal) the identifier may be used by the speech recognition system 222 to select the appropriate user speech profile. Accordingly, the voice patterns for the specific user may be used by the speech recognition system to process voice signals from the user. Alternatively, a wireless mobile communication device 230, e.g., a cellular phone, may transmit an identifier that may be used by control module 202 and speech recognition system 222 to select the appropriate user speech profile. For example, a Bluetooth enabled phone may transmit an identifier when a wireless communication link is established when the Bluetooth enabled phone comes into proximity with the control module 202. Other external wireless devices 236 may also be used to transmit an identifier, such as a PDA, a portable computer, a pager, a passive entry key, a smart card, optical (e.g., infrared) or magnetic entry devices, etc.

In yet another embodiment, an identifier may be provided by an external device 232 such as a vehicle key. When the vehicle key is placed in a door lock of the vehicle, a control signal including an identifier of a user and/or user speech profile may be transmitted to a vehicle bus. As mentioned above, the control module 202 may be coupled to the vehicle bus 234. The control signal may be transmitted from the vehicle key to the vehicle bus via electrical contacts in the door lock. Alternatively, a keyless entry code may be used that includes and/or points to an identifier for a user and/or user speech profile. When a user enters a keyless entry code using a user input device such as a keypad on a vehicle door, the data provided or identified by the keyless entry code may be transmitted on the vehicle bus where it is available to control module 202. In another embodiment, a biometric identification device such as an optical scanner or a fingerprint recognition device may be used to provide an identifier for a user and/or user speech profile. In yet another embodiment, a removable memory device may be used to provide an identifier for the user and/or user speech profile. For example, an input for the removable memory device may be provided at the control module 202 or at another location in the vehicle. As mentioned above, control module 202 is preferably coupled to a vehicle bus to access data from other devices in the vehicle.

In one embodiment, control module 202 may be configured to include a prioritization of the devices used to identify a user speech profile. A user may provide a prioritization list that may be stored in memory 224 that indicates which device should be used to identify a user speech profile, for example, a user may indicate a key fob should be the primary means to identify the user. Alternatively, the control module may prompt the user, for example by a display or user interface 210, to select a user speech profile if there is a mismatch between the various devices.

Figure 3:
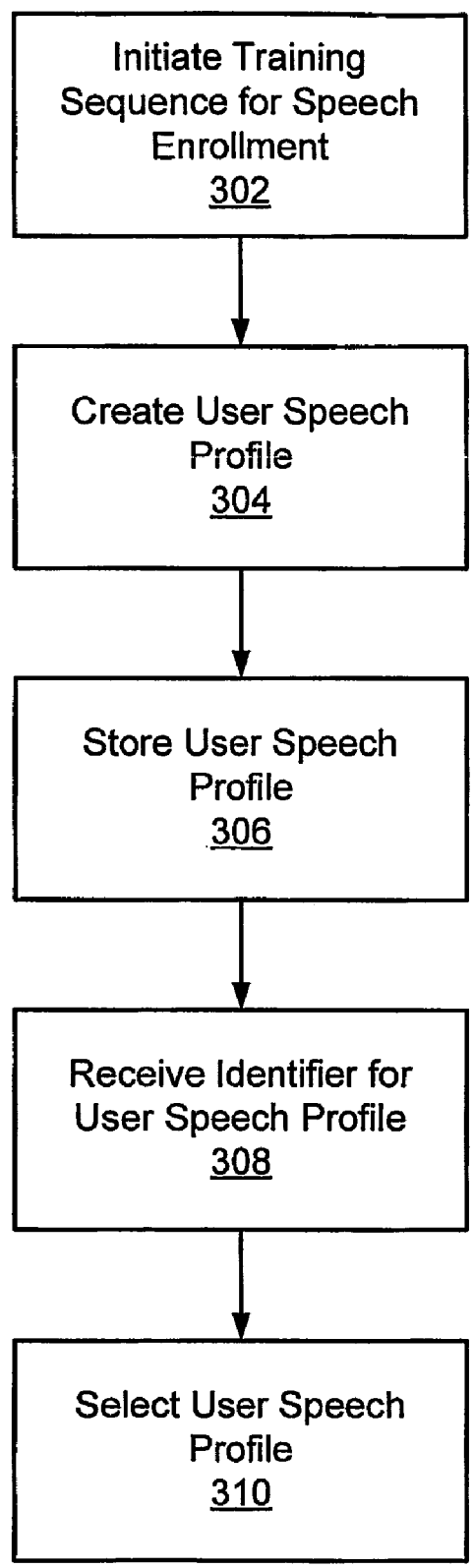
FIG. 3 illustrates a method for selecting a user speech profile for a device in a vehicle in accordance with an embodiment.

FIG. 3 illustrates a method for selecting a user speech profile for a device in a vehicle including or utilizing a speech recognition system in accordance with an embodiment. At block 302, a user initiates a training sequence for a speaker enrollment function of the speech recognition system associated with the vehicle device (e.g., a hands-free telephone system, a navigation system, etc.). The training sequence may be initiated by, for example, the user actuating an input device of a user interface. The user may, for example, perform a series of steps in which the user speaks predetermined words, phrases and/or sentences into a microphone. The speaker enrollment function processes the voice and dialect of the user and creates a user speech profile at block 304. At block 306, the user speech profile may be stored in a memory of the speech recognition system. At block 308, a control module and/or speech recognition system receives an identifier that enables the speech recognition system to select a user speech profile at block 310. As discussed above with respect to FIG. 2, various external devices and/or user input devices may be used to provide an identifier used to select the user and/or user speech profile (block 310). For example, a user interface may be used to select a memory location for a user speech profile or an external wireless device (e.g., key fob, wireless phone), external device (e.g., vehicle key), keyless entry code, etc. may be used to provide an identifier for a user and/or user speech profile.

It is important to note that the construction and arrangement of the systems and devices as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A system for selecting a user speech profile using a first portable electronic device and a second portable electronic device, the user speech profile for a device in a vehicle, the system comprising:
   a control module including:
      a speech recognition system configured to process audio signals and having a speaker enrollment function configured to create a user speech profile for at least one user, and
      a memory coupled to the speech recognition system and configured to store a first user speech profile and a second user speech profile, the first user speech profile associated with a first portable electronic device identifier and the second user speech profile associated with a second portable electronic device identifier, wherein the memory also stores prioritization data for the first portable electronic device identifier and the second portable electronic device identifier; and
   a receiver configured to receive a first control signal from the first portable electronic device and a second control signal from the second portable electronic device, the first control signal including the first portable electronic device identifier and the second control signal including the second portable electronic device identifier;
   wherein the control module uses the prioritization data to select a user speech profile from the first and second user speech profiles and wherein the speech recognition system uses the selected user speech profile to process audio signals.

2. A system according to claim 1, wherein the device in the vehicle is a hands-free wireless communication system.

3. A system according to claim 2, wherein the hands-free wireless communication system is a hands-free telephone system.

4. A system according to claim 1, wherein the device in the vehicle is a navigation system.

5. A system according to claim 1, wherein the first portable electronic device and the second portable electronic devices are configured to communicate with the receiver using a wireless communications protocol.

6. A system according to claim 1, wherein the first portable electronic device is one of a personal digital assistant, a key fob, and a mobile phone.

7. A system according to claim 6, wherein the second portable electronic device is one of an RKE key fob, a wireless phone, a personal digital assistant, a pager, a portable computer, a passive entry key, a smart card, an optical entry device, or a magnetic entry device.

8. A system according to claim 1, wherein the system is mounted in at least one automobile interior element including one of a dashboard, an instrument panel, an overhead console, a visor, and a rearview mirror.

9. A method for selecting a user speech profile for a device in a vehicle, the method comprising:
   creating a user speech profile for a first user and a second user using a speaker enrollment function of a speech recognition system;
   storing a plurality of user speech profiles, each user speech profile associated with a different user;

associating a first portable electronic device with the first user and a second portable electronic device with the second user;

prioritizing the first portable electronic device and the second portable electronic device;

receiving a first control signal from the first portable electronic device and a second control signal from the second portable electronic device; and automatically selecting one of the user speech profile for the first user and the second user, the selection based on the first control signal, the second control signal, and the prioritization of the first portable electronic device and the second portable electronic device.

10. A method according to claim 9, wherein the first and second portable electronic devices are wireless devices configured to communicate with a receiver in a vehicle using radio frequency communications.

11. A method according to claim 9, further comprising:

associating a third portable electronic device with the first user and a fourth portable electronic device with a second user, and wherein the third and fourth portable electronic devices are also prioritized, and wherein the automatically selecting step is further based on the prioritization of the third and fourth portable electronic devices.

12. A method for using a speech recognition system of a vehicle, the method comprising:

automatically receiving radio frequency signals from a plurality of portable electronic devices located within proximity of the vehicle; and using pre-established prioritization information to select a user speech profile for the speech recognition system from a plurality of user speech profiles, the pre-established prioritization information indicating which of the plurality of user speech profiles should be selected for the speech recognition system when the radio frequency signals are received from the plurality of portable electronic devices.

13. The method of claim 12, further comprising:

associating each of the plurality of portable electronic devices with at least one of the plurality of user speech profiles using an enrollment function of the speech recognition system.

14. The method of claim 13, further comprising:

updating the pre-established priority list based on user input.

15. The method of claim 14, wherein the plurality of portable electronic devices are devices configured to communicate via a Bluetooth communications protocol.

* * * * *